UNITED STATES PATENT OFFICE.

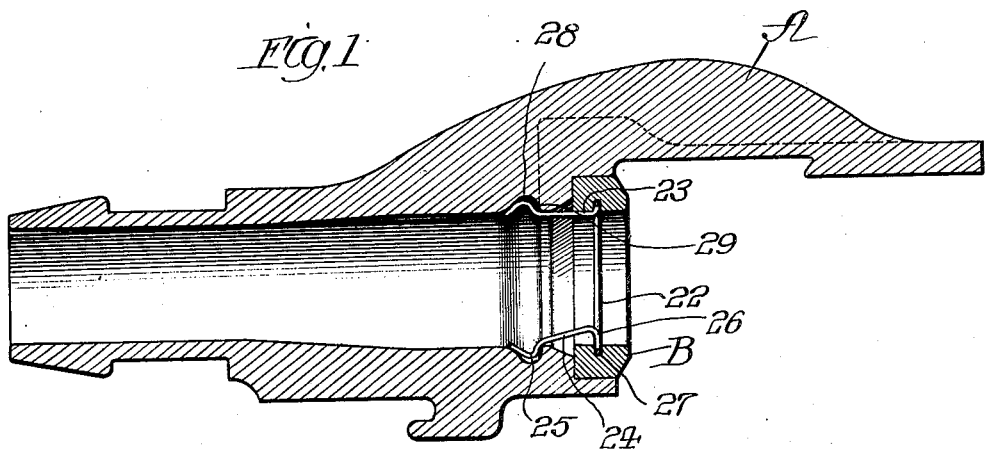
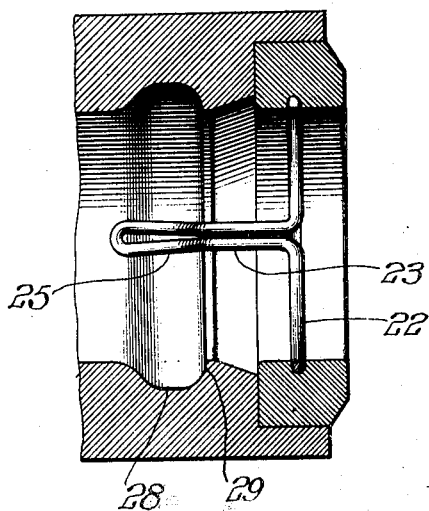
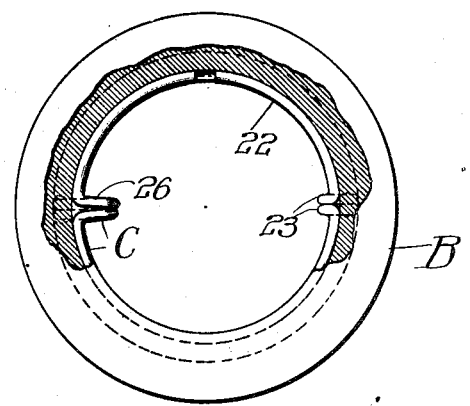
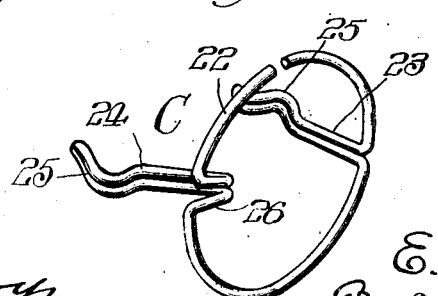

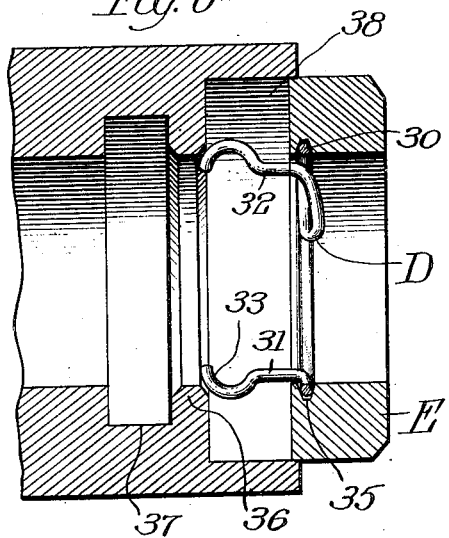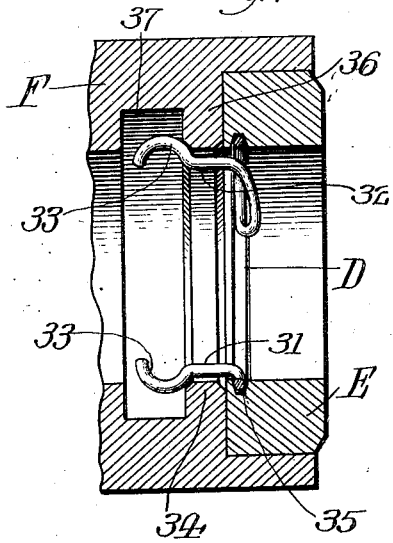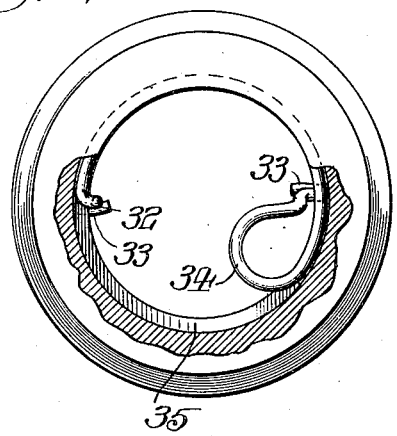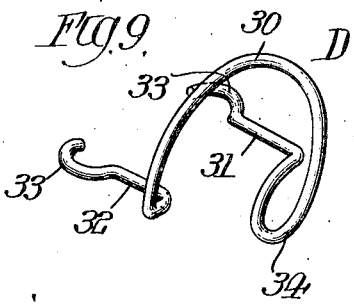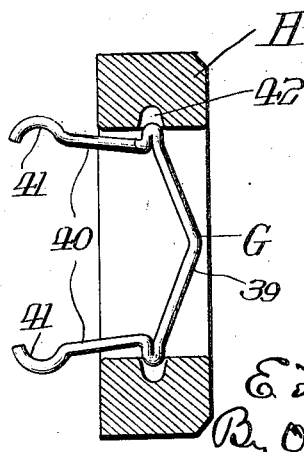

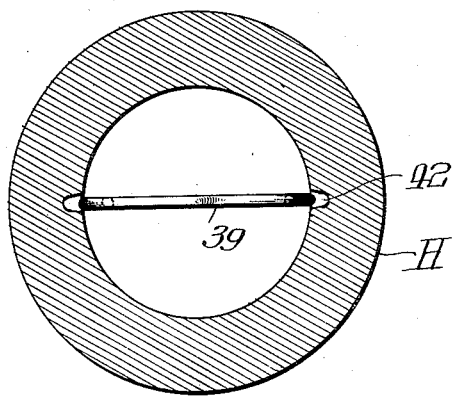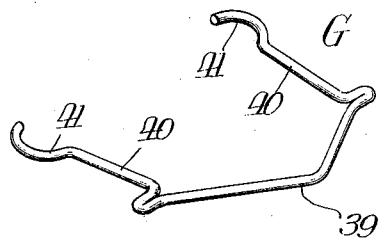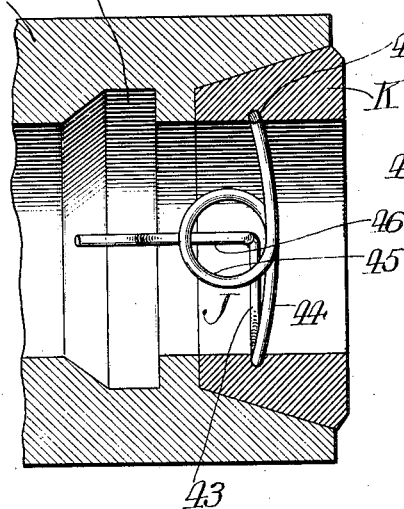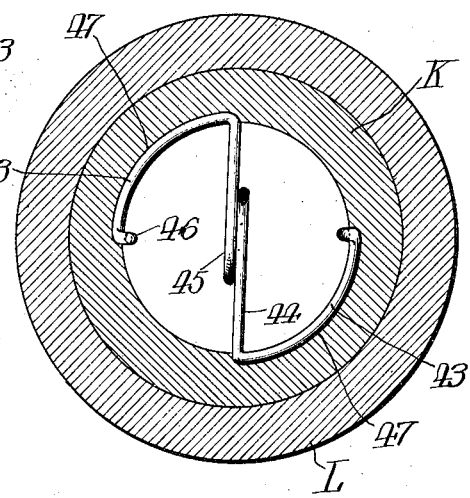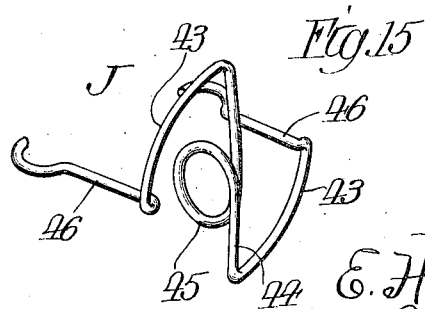

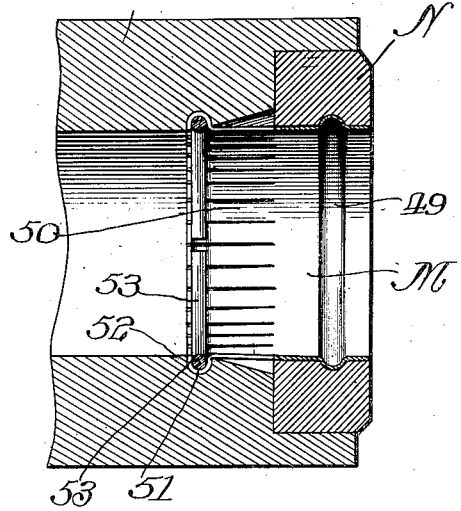
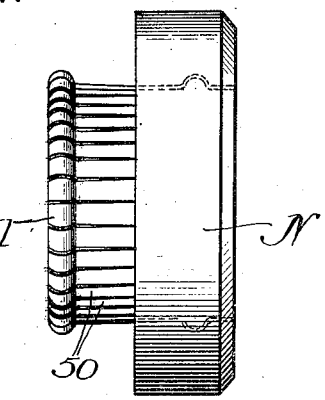
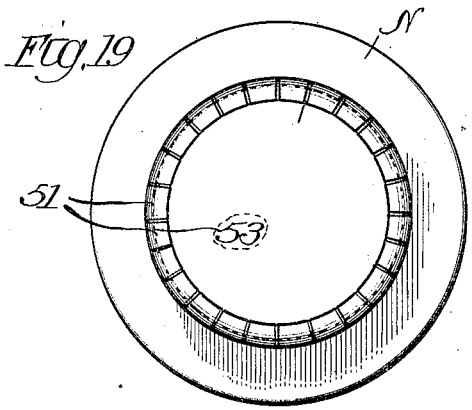
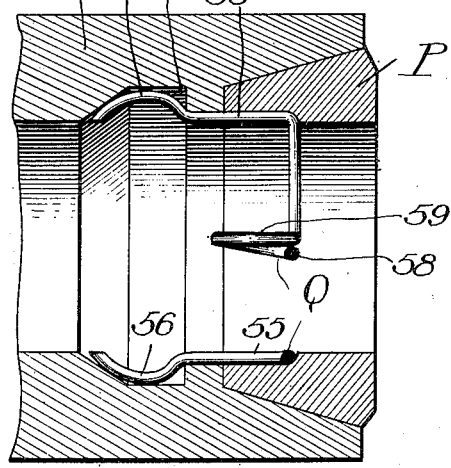
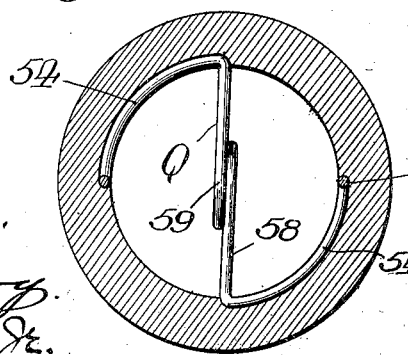

EGBERT H. GOLD, OF CHICAGO, ILLINOIS.

COUPLING.

No. 922,132.

Specification of Letters Patent.

Patented May 18, 1909.

Application filed June 13, 1908. Serial No. 438,386.

*To all whom it may concern:*

Be it known that I, EGBERT H. GOLD, a citizen of the United States, residing at Chicago, in the county of Cook and State of Illinois, have invented certain new and useful Improvements in Couplings, of which the following is a specification.

My invention relates to a coupling and particularly to means for retaining a gasket or the like in said coupling, and has for its object to provide a simple, inexpensive retaining device for the gasket which will hold it securely in the coupling, allow it to be removed and replaced with ease, which will present little or no obstruction in the passage-way through the coupling, and which is so arranged and related to the coupling as not to be dislodged or disengaged if by accident any solid object is forced through the coupling.

The device of my invention is designed particularly for use in a steam train-pipe hose-coupling for railroad cars and it is one of the principal objects of my invention to provide a new and improved construction for such hose couplers, gaskets and retaining means. The invention might, however, be utilized in different connections where it is necessary to retain a gasket in the end of a coupling or any sort of pipe.

The invention has for further objects such other new and improved devices, arrangements and constructions in couplings, gaskets and retaining devices as will be described in the following specification and specified in the claims appended thereto.

The invention, as embodied in several different forms, is illustrated in the accompanying drawings, wherein—

Figure 1 shows in longitudinal section one member of a coupling constructed in accordance with my invention. Fig. 2 is a detail longitudinal section at right angles to that of Fig. 1. Fig. 3 is an inner end elevation, parts of the gasket being broken away. Fig. 4 is a perspective view of the retaining device shown in the previous figures. Fig. 5 is a detail illustrating in exaggerated proportions a preferred construction. Fig. 6 is a portion of the coupler and gasket in longitudinal section showing the gasket disengaged. Fig. 7 is a similar view with the gasket in engagement. Fig. 8 is an end view of the coupling of Figs. 6 and 7. Fig. 9 is a perspective view of the form of retaining device shown in the three previous figures. Fig. 10 is a gasket in section illustrating a modified form of retaining device. Fig. 11 is an end view of the same. Fig. 12 is a perspective view of this form of retaining device. Fig. 13 is a longitudinal section illustrating another modification. Fig. 14 is an end view of the same. Fig. 15 is a perspective view of this form of retaining device. Fig. 16 is a further modification shown in longitudinal section. Fig. 17 is a sectional view of the ring employed in the modification shown in Fig. 16. Fig. 18 is a side elevation of the gasket and retaining device of this modification. Fig. 19 is an end elevation of the same. Fig. 20 is a longitudinal section through a coupling illustrating a further modification; and Fig. 21 is an end view of the same.

Like characters of reference indicate like parts in the several figures of the drawings.

Referring first to Figs. 1 to 5 inclusive, A represents one member of a coupler of known construction used for the coupling together of the hose forming the connection between the steam train pipes on railway cars. B is a gasket ordinarily made of rubber compound, and which is seated in a recess in the inner end of the coupling, as shown. C is a preferred form of retaining device for holding the gasket in the coupling. This retaining device is preferably constructed out of stiff, spring wire, being bent, as shown in Fig. 4, so as to form a ring 22 and the fingers 23, 24, which latter, in this particular form of device, are, in effect, loops from ring 22. These fingers are formed with bends 25 and finger 24 is given a further bend, as shown at 26. Ring 23 is normally left open a trifle. By compressing it, it may be forced into the groove 27 in gasket B, the elasticity of the metal securely holding the ring to the gasket when it has been inserted in the groove. The coupling is formed with an internal groove or recess 28, which forms means by which bends 25 on the fingers may frictionally grip the inner surface of the coupling. It is well known that, because of the action of the steam, shoulders, such as the shoulder 29 formed by groove 28, easily become worn down. I, therefore, preferably make the bends 25 longer than the width of the groove 28, so that the shoulder 29 is in contact farther down on the finger than the corner between the relatively straight part and the bend. The elasticity of the fingers will, therefore, take up any wear on the shoulder 29 and keep the gasket held tightly in the coupling.

This arrangement is shown in somewhat exaggerated proportions in Fig. 5. It will be observed that the retaining device has an elastic, frictional grip upon both the gasket and the coupling, although the grip on the latter is so much less that, under ordinary circumstances, the retaining device will always remain in the gasket. When it is desired to remove the gasket from the coupler, any hooked instrument may be hooked through bend 26 and, by giving a sharp pull, fingers 23, 24 will give sufficiently to be disengaged from the coupler. In this arrangement the retaining device offers practically no obstruction to the passage-way through the coupling. The bends 25 fit into the groove 28, so that they cannot be dislodged if, as often happens, a body of solid matter, such as a piece of rubber hose, is driven through the coupling by the force of the steam.

In Figs. 6, 7, 8 and 9 I have shown a modified form of retaining device together with a modified construction of coupling. The retaining device D in this case consists of a ring member 30, a little more than semi-circular, the ends of which are bent to form fingers 31, 32 having bends 33, the end of the ring member at 31 being bent out to form a loop 34 to make an attachment by which the gasket can be removed from the coupling. The ring member is sprung into a groove 35 in gasket E, the bends 33 engaging with the shoulder 36 formed by the groove 37 in coupling F. The edges of shoulder 36 are preferably beveled as shown. The coupling shown in these figures illustrates a preferred construction, whereby the gasket is more easily forced into engagement with the coupling, the same construction in this respect being a feature of Figs. 1 to 4 inclusive, although there not so clearly shown. As appears from Fig. 6, which shows the gasket about to be pushed into the coupler, the fingers 31, 32 are not begun to be flexed until the gasket has entered the recess 38 in the end of the coupling. The gasket is, therefore, guided in its further movement inwardly, which facilitates the flexing of the spring fingers.

Figs. 10 to 12 inclusive illustrate another modified form of gasket-retaining device G, which consists, as it is manufactured, of a bowed portion 39 and the spring fingers 40 having the bends 41. The device is expanded into groove 42 of gasket H by flattening the bowed portion with a hammer, as shown in Fig. 10.

Figs. 13, 14 and 15 illustrate another modified form of gasket-retaining device. The retaining device J consists of the two arcuate portions 43 connected together by the cross-piece 44, which has the loop 45, the ends of the wire being bent to form the fingers 46. The curved parts 43 seat in recesses 47 in gasket K, the fingers engaging with the groove 48 in coupling L. Loop 45 gives added resiliency both to the gasket engagement and the coupling engagement.

Figs. 16 to 19 inclusive illustrate a still further modification of the gasket-retaining means. This form of device consists of a cylindrical bushing M formed with an offset ring 49, which fits into a corresponding recess in gasket N. The inner end of the cylinder is slit so as to form a plurality of fingers 50, which fingers are formed with bends 51 which fit into a groove 52 in coupler O. This form of device, therefore, consists of a ring engaging the gasket, from which project a plurality of fingers the same as the devices of some of the previous figures, but in this case the form of the device is adapted to the particular material used, which is sheet metal rather than the wire of the previously described forms. The device operates on the same principle. In order to reinforce the grip of the fingers on the coupling, I prefer to supplement the fingers with a split ring 53.

A further modification of my gasket-retaining device is shown in Figs. 20 and 21. In this case gasket P is formed with both transverse and longitudinal grooves on its inner surface to receive the curved members 54 and the fingers 55 of the retaining device Q, the fingers having the bends 56 which engage in the groove 57 in the coupling R. Curved members 54 are connected by a cross-piece 58 which has the loop 59 giving resiliency to the retaining device and also affording means by which the device may be engaged in order to remove the gasket from the coupling.

It will be observed that in all the modifications shown the retaining device consists of means for engaging the inner surface of the gasket by a frictional engagement, this means consisting preferably of an elastic ring or partial ring; and of flexible fingers which project from the ring device and engage with the inner surface of the coupling, which is preferably recessed for this purpose. In the preferred forms the retaining device is so constructed and arranged as to constitute substantially no obstruction in the passage-way through the coupling and gasket. Preferably also means are provided for the attachment of a hooked instrument to the gasket retainer for removing the gasket from the coupling. In particular, the engagement of the retaining device with the coupling is such that there is no part protruding into the passage-way. This is important in practice because in a coupling hanging from the end of a train it might frequently happen that the retaining device, if it obstructed the passage-way through the coupling at this point, would be forced out of engagement with the coupling by a piece of hose or other solid matter being forced through the coupling by escaping steam or water. The cross wires, which are features of certain forms of my retaining device, while, to a certain extent, objectionable, are not so likely to cause the disengagement of the gasket as would the ends of the fingers if they projected into the passage-way. The mouth of the coupling shown in Figs. 2 and 13 is tapered. Likewise the corners of the shoulders 36 in the form shown in Fig. 7 are beveled. This gives an inclined surface for the spring fingers to work on which facilitates the attachment of the gasket. Without this it would be difficult to flex the spring fingers, as there would be a tendency of the gasket to rock or slip.

I do not limit myself to the particular devices, constructions and arrangements herein shown, as modifications thereof could be made which would come within the scope of my invention.

I have used the term "coupling" in the claims, but intend the word to be taken in a broad signification. Broadly speaking, the word covers not only a device for connecting rubberhose, but the end portion of any pipe or conduit designed to be coupled up with some other pipe or conduit.

I have designated the part of the retainer which engages the gasket in certain preferred embodiments of my invention as a ring device. This part of the device does not, in any of the forms, form a complete circumference, but engages with such a portion of the inner circumference of the gasket as to have a proper hold upon the gasket.

I claim:

1. The combination with a coupling and a gasket, of a retaining device for the gasket consisting of a single wire bent so as to form an engaging member for the gasket, and a spring finger extending at substantially right angles to the plane of the engaging member adapted to engage with the inner surface of the coupling.

2. The combination with a coupling and a gasket, of a retaining device for the gasket consisting of a single wire bent so as to form an engaging member for the gasket, and a spring finger extending at substantially right angles to the plane of the engaging member for engaging the inner surface of the coupling and so formed as to constitute a loop whereby the gasket and retaining device may be removed from the coupling.

3. The combination with a coupling and a gasket, of a retaining device for the gasket consisting of a single piece of wire bent so as to form a ring device, and spring fingers projecting from the ring at substantially right angles to the plane thereof and having bends.

4. The combination with a coupling and a gasket, each having an internal groove, of a retaining device for the gasket comprising a single wire bent so as to lie in one of said grooves, and fingers projecting from the loop at substantially right angles to the plane thereof and provided with bends which extend into the other groove.

5. The combination with a coupling and a gasket, of a retaining device for the gasket comprising a member adapted to engage the gasket, and separate spring fingers adapted to frictionally and impositively engage the coupling inwardly of the gasket, one of said fingers being provided with a bend extending into the bore of the coupler by which the gasket can be removed, substantially as described.

6. The combination with a coupling and a gasket, of a retaining device for the gasket composed of a single wire bent so as to form a split ring to engage the inner surface of the gasket, and spring fingers standing substantially at right angles to the plane of the ring for engaging the inner surface of the coupler.

7. The combination with a coupling and a gasket, of a retaining device for the gasket composed of a single wire bent so as to form a split ring to engage the inner surface of the gasket, spring fingers standing substantially at right angles to the plane of the ring for engaging the inner surface of the coupler, and a bend projecting into the bore of the coupler, whereby the gasket and retaining device may be removed, substantially as described.

EGBERT H. GOLD.

Witnesses:
P. H. TRUMAN,
H. L. PECK.